United States Patent
Wang et al.

(10) Patent No.: US 9,637,830 B2
(45) Date of Patent: May 2, 2017

(54) CAPILLARY PHOTOELECTRODE STRUCTURES FOR PHOTOELECTROCHEMICAL AND PHOTOCATALYTIC CELLS

(71) Applicant: The United States of America as Represented by the Secretary of Agriculture, Washington, DC (US)

(72) Inventors: Xudong Wang, Middleton, WI (US); Zhaodong Li, Shaanxi (CN); Zhiyong Cai, Madison, WI (US); Chunhua Yao, Jiangxi (CN)

(73) Assignee: The United States of America as Represented by the Secretary of Agriculture, Washington, CT (US)

( * ) Notice: Subject to any disclaimer, the term of this patent is extended or adjusted under 35 U.S.C. 154(b) by 349 days.

(21) Appl. No.: 14/166,740

(22) Filed: Jan. 28, 2014

(65) Prior Publication Data
US 2015/0211134 A1    Jul. 30, 2015

(51) Int. Cl.
C25B 1/00    (2006.01)
C25B 11/04    (2006.01)
C25B 15/08    (2006.01)
C25B 11/03    (2006.01)

(52) U.S. Cl.
CPC ............. *C25B 11/04* (2013.01); *C25B 1/003* (2013.01); *C25B 11/035* (2013.01); *C25B 15/08* (2013.01); *Y02P 20/135* (2015.11)

(58) Field of Classification Search
CPC ....... C25B 11/04; C25B 1/003; C25B 11/035; C25B 1/02
USPC ........................................ 205/340; 204/275.1
See application file for complete search history.

(56) References Cited

U.S. PATENT DOCUMENTS 3,350,232 A * 10/1967 Von Dohren ......... H01M 4/881
429/492
4,112,352 A * 9/1978 Barben, II ........... G01N 27/301
204/433
4,401,371 A * 8/1983 Neefe .............. B29D 11/00076
205/340
4,511,450 A * 4/1985 Neefe ..................... C25B 1/003
422/186

(Continued)

FOREIGN PATENT DOCUMENTS

BR    PI0815686-7 A2 * 12/2010

OTHER PUBLICATIONS

BR PI0815686-7 A2 Derwent abstract.*
BR PI0815686-7 A2 translation (abstract).*
Qing Y., et al., "Resin Impregnation of Cellulose Nanofibril Films Facilitated by Water Swelling", Cellulose, 2013, vol. 20, pp. 303-313.

(Continued)

*Primary Examiner* — Keith Hendricks
*Assistant Examiner* — Colleen M Raphael
(74) *Attorney, Agent, or Firm* — John Fado; John Dellinger; Janet I. Stockhausen

(57) ABSTRACT

Photocatalytic structures having a capillary-force based electrolyte delivery system are provided. Also provided are photoelectrochemical and photocatalytic cells incorporating the structures and methods for using the cells to generate hydrogen and/or oxygen from water. The photocatalytic structures use an electrolyte-transporting strip comprising a porous network of cellulose nanofibers to transport electrolyte from a body of the electrolyte to a porous photoelectrode or a porous photocatalytic substrate via capillary force.

22 Claims, 9 Drawing Sheets

(56) References Cited

U.S. PATENT DOCUMENTS

| | | | |
|---|---|---|---|
| 2001/0032785 A1* | 10/2001 | Cha | G01N 27/301 204/435 |
| 2003/0228727 A1* | 12/2003 | Guerra | C25B 1/003 438/200 |
| 2009/0183994 A1* | 7/2009 | Misra | C25B 1/003 205/340 |
| 2009/0309072 A1* | 12/2009 | Hwang | C01B 31/0226 252/506 |
| 2010/0266896 A1* | 10/2010 | Stromme | C08J 7/047 204/290.01 |
| 2013/0280616 A1* | 10/2013 | Machii | H01G 11/52 429/249 |
| 2014/0079931 A1* | 3/2014 | Berglund | C08J 9/28 428/219 |
| 2015/0037651 A1* | 2/2015 | Huang | H01M 2/1626 429/142 |

OTHER PUBLICATIONS

Saito T., et al., "Individualization of Nano-Sized Plant Cellulose Fibrils by Direct Surface Carboxylation Using TEMPO Catalyst Under Neutral Conditions", Biomacromolecules, Jul. 13, 2009, vol. 10, pp. 1992-1996.

Formal F. L., et al., "Passivating Surface States on Water Splitting Hematite Photoanodes with Alumina Overlayers", Chem. Sci., 2011, vol. 2, pp. 737-743.

Horowitz G., "Capacitance-Voltage Measurements and Flat-Band Potential Determination on Zr-Doped Fe2O3 Single-Crystal Electrodes", J. Electroanal. Chem., 1983, vol. 159, pp. 421-436.

Sanchez C., et al., "The Photoelectrochemistry of Niobium Doped Fe2O3", J. Electroanal. Chem., 1988, vol. 252, pp. 269-290.

Dare-Edwards M. P., et al., "Electrochemistry and Photoelectrochemistry of Iron (III) Oxide", J. Chem. Soc. Faraday Tras. 1, 1983, vol. 79, pp. 2027-2041.

\* cited by examiner

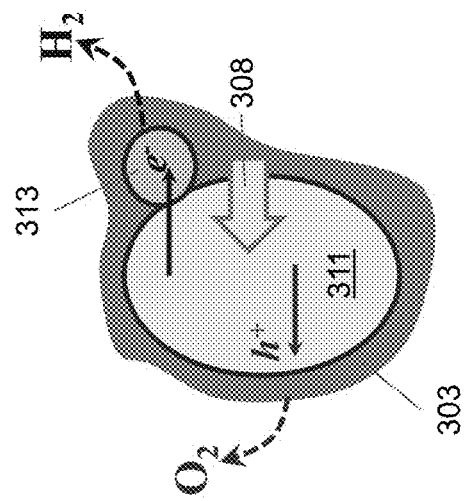
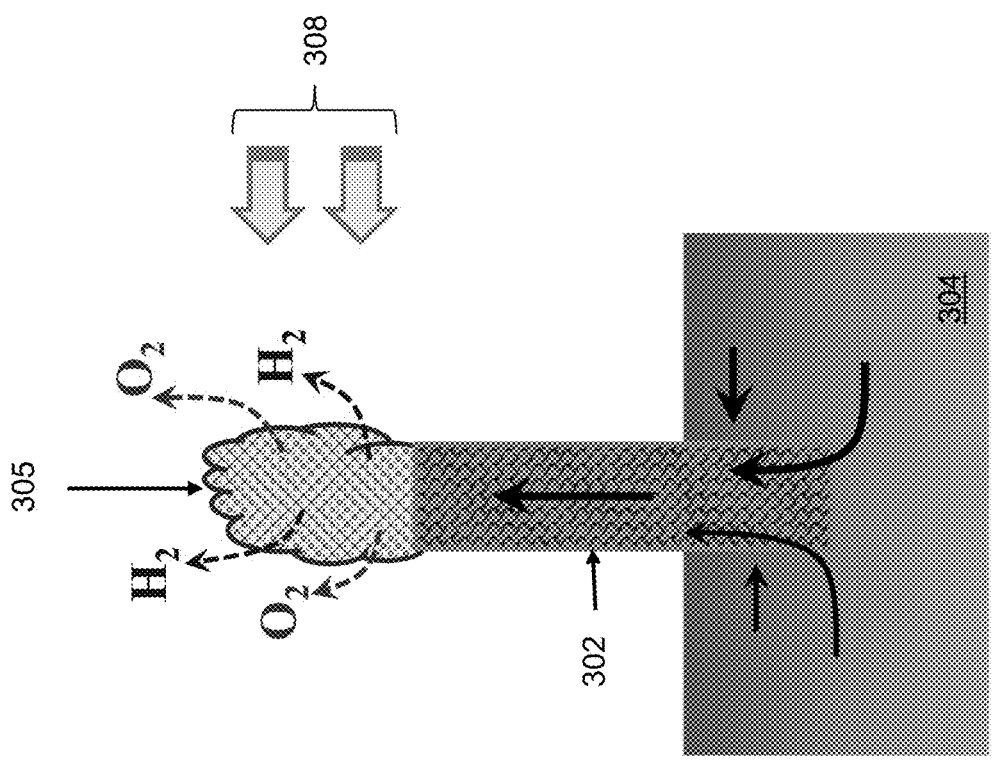
FIG. 3(B)
FIG. 3(A)

US 9,637,830 B2

CAPILLARY PHOTOELECTRODE STRUCTURES FOR PHOTOELECTROCHEMICAL AND PHOTOCATALYTIC CELLS

REFERENCE TO GOVERNMENT RIGHTS

This invention was made with government support under grant number DE-SC0008711 awarded by the Department of Energy. The government has certain rights in the invention.

BACKGROUND

Among current endeavors to explore renewable energy technologies, photoelectrochemical (PEC) water splitting holds great promise for the conversion of solar energy to chemical energy. Light absorption, charge separation, and appropriate interfacial redox reactions are three key aspects that lead to highly efficient solar energy conversion via PEC water splitting. Therefore, the development of high-performance PEC electrodes has concentrated largely on engineering the band structure of photoanodes, enlarging the semiconductor-electrolyte interfacial area, and enabling rapid charge separation, collection, and transportation. High porosity three dimensional (3D) nanostructures, such as branched nanowire architectures and nanofiber networks, offer extremely large surface area, excellent charge transport properties, and long optical paths for efficient light absorption. As a result, 3D nanostructures are of interest in PEC photoanode development.

SUMMARY

Photocatalytic structures for use in photocatalytic water spilling are provided. The photocatalytic structures include a capillary-force based electrolyte delivery system to deliver electrolyte from a body of electrolyte to a porous photocatalytic material that is separated from the body of electrolyte. Also provided are photoelectrochemical cells and photocatalytic cells that incorporate the photocatalytic structures and methods for using the cells to generate hydrogen and/or oxygen from water.

One embodiment of a photoelectrochemical cell comprises: (a) a body of electrolyte; (b) a capillary photoelectrode structure comprising: (i) an electrolyte-transporting strip comprising a porous network of cellulose nanofibers, and (ii) a working electrode comprising a porous photocatalytic material; and a counter electrode in electrical communication with the working electrode. In the cell, the electrolyte-transporting strip separates the body of electrolyte from the porous photocatalytic material and is configured to transport electrolyte from the body of electrolyte to the porous photocatalytic material via capillary force.

A photoelectrochemical cell having a capillary photoelectrode structure comprising: an electrolyte-transporting strip comprising a porous network of cellulose nanofibers; and a working photoelectrode comprising a porous photocatalytic material in contact with a first portion of the electrolyte-transporting strip can be used in method of producing hydrogen. One embodiment of such a method comprises the steps of: contacting a second portion of the electrolyte-transporting strip with a body of aqueous electrolyte, whereby aqueous electrolyte from the body of aqueous electrolyte is transported through the porous network of cellulose nanofibers and into the porous photocatalytic material via capillary force; exposing the porous photocatalytic material and the aqueous electrolyte contained therein to radiation that induces the photoelectrochemical splitting of water in the aqueous electrolyte to $H_2$ and $O_2$; and collecting the $H_2$.

An embodiment of a photocatalytic cell comprises: (a) a body of electrolyte; and (b) a capillary photocatalytic structure comprising: (i) an electrolyte-transporting strip comprising a porous network of cellulose nanofibers and (ii) a photocatalytic substrate comprising a porous photocatalytic material. In the cell, the electrolyte-transporting strip separates the body of electrolyte from the porous photocatalytic material and is configured to transport electrolyte from the body of electrolyte to the porous photocatalytic material via capillary force.

A photocatalytic cell having a capillary photocatalytic structure comprising: an electrolyte-transporting strip comprising a porous network of cellulose nanofibers; and a photocatalytic substrate comprising a porous photocatalytic material in contact with a first portion of the electrolyte-transporting strip can be used in a method of producing hydrogen. One embodiment of such a method comprises the steps of: contacting a second portion of the electrolyte-transporting strip with a body of aqueous electrolyte, whereby aqueous electrolyte from the body of aqueous electrolyte is transported through the porous network of cellulose nanofibers and into the porous photocatalytic material via capillary force; exposing the porous photocatalytic material and the aqueous electrolyte contained therein to radiation that induces the photocatalytic splitting of water in the aqueous electrolyte to $H_2$ and $O_2$; and collecting the $H_2$.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 3(A). Schematic illustration of a capillary photocatalytic cell for photocatalytic water splitting.

FIG. 3(B). Schematic diagram illustrating the operation of the photocatalytic substrate in the cell in FIG. 3(A).

DETAILED DESCRIPTION

Photocatalytic structures having a capillary-force based electrolyte delivery system (capillary photocatalytic structures) are provided. Also provided are photoelectrochemical cells (capillary PEC cells) and photocatalytic cells (capillary PC cells) incorporating the capillary photocatalytic structures and methods for using the cells to generate hydrogen from water.

The capillary photocatalytic structures use an electrolyte-transporting strip comprising a porous network of cellulose nanofibers to transport electrolyte from a body of the electrolyte to a porous photocatalytic material via capillary force. In some embodiments, the porous photocatalytic material is a photoelectrode for use in a PEC cell. In other embodiments, the porous photocatalytic material is a photocatalytic substrate for a PC cell. However, unlike conventional photoelectrodes and photocatalytic substrates, which are submerged in a body of liquid electrolyte during cell operation, the present photoelectrodes and photocatalytic substrates are physically separated from the body of electrolyte, but have small volumes of electrolyte delivered to them through nano- and/or micro-scale channels in the electrolyte-transporting strip. The hydrophilic properties of the cellulose nanofibers in the porous electrolyte-transporting strips renders them well-suited to deliver aqueous electrolyte to a porous photoelectrode or photocatalytic substrate where water-splitting reactions take place outside of a bulk electrolyte body.

Figure 1:
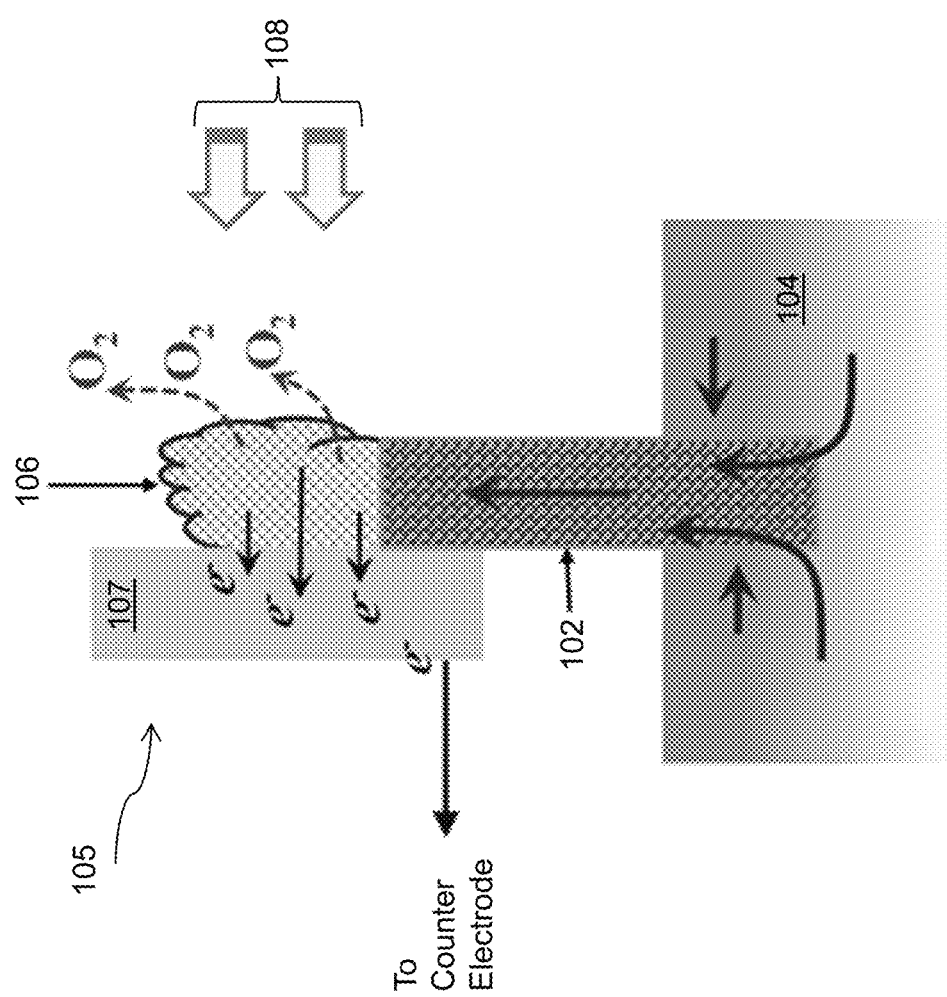
FIG. 1. Schematic diagram of a capillary photoelectrode structure used for photoelectrochemical water splitting.
Figure 4:
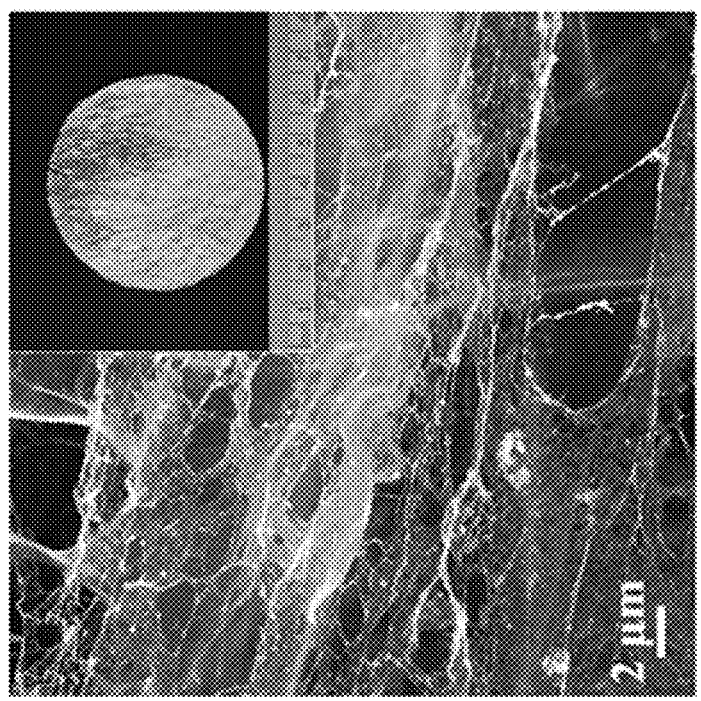
FIG. 4. Morphology and structure of a porous network of cellulose nanofibers; inset is a single, large-area piece of the porous network of cellulose nanofibers.

An illustrative embodiment of a capillary photocatalytic structure that includes a photoelectrode for a PEC cell is shown in FIG. 1. For the purpose of this disclosure, capillary photocatalytic structures for use in PEC cells are referred to as "capillary photoelectrode structures". The capillary photoelectrode structure comprises an electrolyte-transporting strip 102 comprising a porous network of cellulose nanofibers. The cellulose nanofibers are composed of highly elongated cellulose fibrils that are present in, and can be derived from, natural plant resources. The cellulose nanofibers, which are sometimes referred to as nanofibrillated cellulose, are long and flexible and can be branched or unbranched. They exhibit mechanical properties (e.g., tensile strength and Young's modulus) comparable to other broadly-used engineering materials, such as carbon fibers and glass fibers, and demonstrate great absorbability in both hydrophilic and hydrophobic materials. The cellulose nanofibers comprise cellulose and may also comprise hemicelluloses and lignin. The cellulose nanofibers have nanoscale diameters of no greater than about 1000 nm and, more typically, no greater than about 200 nm. In the electrolyte-transporting strips, the cellulose nanofibers take the form of a porous three-dimensional fibrous network, wherein the pores in the network form channels through which an electrolyte is driven by capillary action (illustrated by solid arrows in FIG. 1). An example of a porous network of cellulose nanofibers is shown in FIG. 4 and described in greater detail in the Example.

One end of strip 102 is immersed in a body of electrolyte 104. Body of electrolyte 104 is a volume of liquid electrolyte that provides a source of electrolyte for a PEC cell. In a conventional PEC cell the photoelectrode would be submerged in the body of electrolyte. The electrolyte is desirably a hydrophilic electrolyte, such as an aqueous electrolyte. In some embodiments, the electrolyte is sea water, that is, salt water from a natural body of water such as an ocean, sea or lake.

Figure 6:
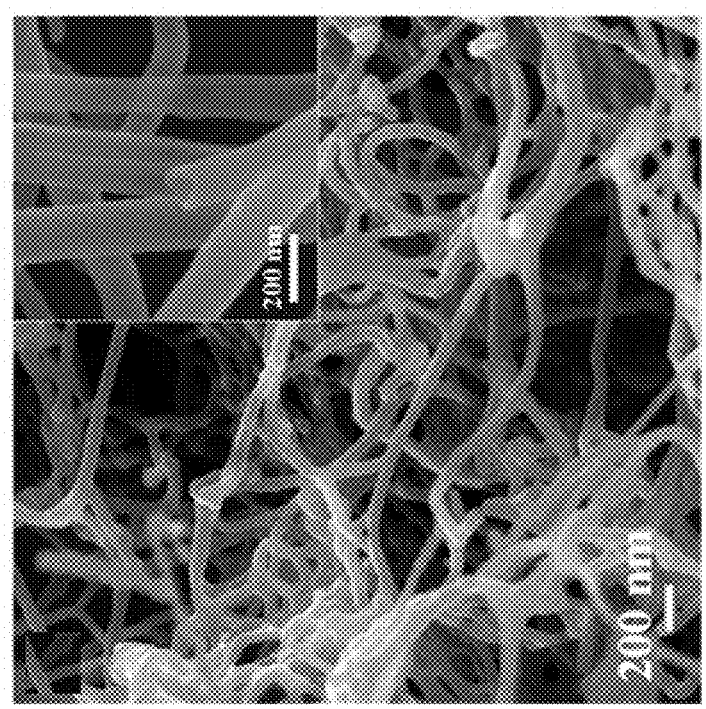
FIG. 6. Morphology and structure of a porous network of photocatalytic $TiO_2$ nanotubes formed by after annealing the structure shown in FIG. 5 at 600° C. for 24 hours; inset shows an enlarged broken tip of a $TiO_2$ nanotube, revealing the hollow tubular structure.

The other end of strip 102 is in contact with a working photoelectrode 105 comprising a porous network of photocatalytic semiconducting nanofibers 106. As shown in FIG. 1, the network of photocatalytic nanofibers may be attached to an electrically conductive electrode substrate 107, such as a transparent conducting oxide or metal contact. Like the cellulose nanofibers, the photocatalytic semiconducting nanofibers have nanoscale diameters of no greater than about 1000 nm and, more typically, no greater than about 200 nm and form of a porous three-dimensional fibrous network, wherein the pores in the network form channels through which an electrolyte may be driven by capillary action. An example of a porous network of $TiO_2$ nanofibers is shown in FIG. 6 and described in greater detail in the Example. Strip 102 and working photoelectrode 105 are in fluid communication in the sense that electrolyte driven through strip 102 via capillary force is fed into the porous network of photocatalytic semiconducting nanofibers 106. Once delivered to the porous network of photocatalytic semiconducting nanofibers, the electrolyte can spread through that network by capillary action. The result is a photoelectrode containing a very small volume of electrolyte spread over a large surface area.

Figure 2:
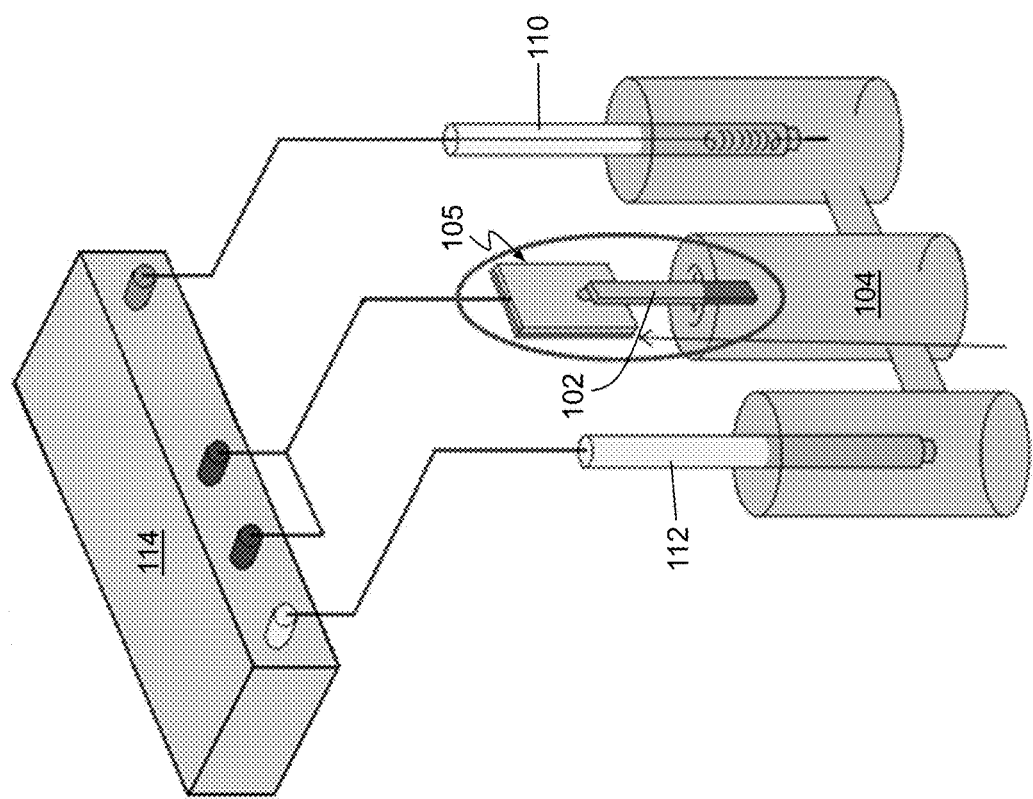
FIG. 2. Schematic diagram of a photoelectrochemical cell that incorporates a capillary photoelectrode.

A capillary PEC cell incorporating the capillary photoanode structure of FIG. 1 will also include a counter electrode in electrical communication with the working electrode through an external circuit. FIG. 2 provides a schematic illustration of the operation of a capillary PEC cell having a capillary photoanode. The PEC cell includes a counter electrode 110 and a reference electrode 112 in electrical communication with working photoelectrode 105 via a potentiostat system 114. In the PEC cell, counter electrode 110, reference electrode 112 and electrolyte transporting strip 102 are submerged in the body of electrolyte 104, but working photoelectrode 105 is disposed above the surface of the body of electrolyte 104.

The capillary PEC cell can be used to generate hydrogen by submerging a portion of electrolyte-transporting strip 102 into a body of aqueous electrolyte 104, whereby aqueous electrolyte is continuously drawn into and through the electrolyte-transporting strip and delivered to the porous network of photocatalytic semiconducting nanofibers 106 via capillary action. The porous network of photocatalytic semiconducting nanofibers and the electrolyte contained therein is then exposed to radiation 108, such as solar radiation, that induces the photoelectrolysis of water in the aqueous electrolyte to form $O_2$ and $H_2$. The $H_2$ can then be collected and used as a fuel in a variety of hydrogen-powered devices.

An illustrative embodiment of a capillary photocatalytic structure that includes a photocatalytic substrate for a PC cell is shown in FIG. 3(A). For the purpose of this disclosure, capillary photocatalytic structures for use in PC cells are referred to as "capillary photocatalytic substrates structures". As in the PEC cell, the capillary photocatalytic structure in the PC cell comprises an electrolyte-transporting strip 302 comprising a porous network of cellulose nanofibers. One end of strip 302 is immersed in a body of electrolyte 304, such as an aqueous electrolyte, that provides a source of electrolyte for a PC cell. The other end of strip 302 is in contact with a porous photocatalytic substrate 305 comprising one or more semiconducting photocatalysts 311, such as $TiO_2$ or $Fe_2O_3$. Photocatalytic substrate 305 further comprises an electrically conductive material, such as metal nanoparticles 313, that facilitates the transport of electrons to the electrolyte. The photocatalysts may be provided in the form of a porous network of photocatalytic semiconducting nanofibers. However, other porous material structures can be used. Strip 302 and photocatalytic substrate 305 are in fluid communication in the sense that electrolyte driven through strip 302 via capillary force is fed into the porous photocatalytic substrate 305. Once delivered to porous photocatalytic substrate 305, the electrolyte can spread through that substrate by capillary action. The result is a photocatalytic substrate containing a very small volume of electrolyte spread over a large surface area.

FIG. 3(B) illustrates the operation of a capillary PC cell shown in FIG. 3(A). Upon illumination 308 of photocatalytic substrate 305, electron-hole pairs are generated in a semiconducting photocatalyst 311. The electrons move through metal nanoparticles 313 to the small volume of electrolyte 303 held within porous photocatalytic substrate 305 and generate hydrogen by reducing the water ($2H^+ + 2e^- \rightarrow H_2$). The holes move through the semiconducting photocatalyst and oxidize the water generating oxygen ($2OH^- + h^+ \rightarrow \frac{1}{2}O_2 + H_2O$). In this type of cell, no counter electrode is needed since both hydrogen and oxygen are generated on the porous photocatalytic substrate. Although the photocatalytic substrate illustrated in this embodiment comprises a composite of a semiconducting metal oxide photocatalyst and metal nanoparticles, other photocatalytic materials can be used. For example, the photocatalytic substrate may comprise semiconductor p-n heterojunctions where photon-generated electron-hole pairs can be separated by the built-in potential to produce $H_2$ and $O_2$ simultaneously.

The photocatalytic semiconducting nanofibers from which the photoelectrodes or photocatalytic substrates are formed can have a variety of morphologies and can be made of a variety of materials. In some embodiments, the photocatalytic semiconducting nanofibers are n-type semiconductor nanofibers. For example, the photocatalytic semiconducting nanofibers may be n-type metal oxide nanofibers, such as $TiO_2$ nanofibers. In other embodiments, the photocatalytic semiconducting nanofibers are p-type semiconductor nanofibers. The nanofibers are highly elongated structures, typically having aspect ratios of at least 10, at least 1000 or at least 10,000. The nanofibers may be nanotubes having a hollow cross-section. However, nanofibers having a solid cross-section can also be used. Methods for fabricating semiconducting nanofibers and nanofiber networks are known. One such method that uses cellulose nanofiber networks as a template for the formation of a porous metal oxide nanotube network is illustrated in the Example, below. As shown in that example, the use of cellulose nanofiber-templated nanotube networks may be advantageous because residual carbon preserved within the interiors of the nanotubes can enhance visible light absorption by the nanotube network and, therefore, provide increased photoactivity.

Although the porous photoelectrode illustrated in FIG. 1 and photocatalytic substrate illustrated in FIG. 3 comprise porous networks of photocatalytic nanofibers, other porous photocatalytic materials can be used, provided those materials form pores having dimensions that facilitate the capillary force-driven spreading of electrolyte into the porous photoelectrode or photocatalytic substrate. For example, in some embodiments the porous structures may be comprised of porous matrices formed from nanoparticles of photocatalytic materials.

EXAMPLE

This example illustrates the fabrication and operation of a capillary PEC cell comprising a capillary photoanode structure that includes a cellulose nanofiber-templated, porous $TiO_2$ nanotube network and a cellulose nanofiber-based electrolyte delivery system.

Experimental:

Fabrication of Films Comprising Porous Networks of Cellulose Nanofibers (CNFs): The nanofibrillated cellulose (NFC) used in the fabrication was tetramethylpiperidine-1-oxy (TEMPO) oxidized wood pulp fiber, which was prepared according to the method reported by Saito et al. (See, Y. Qing, R. Sabo, Z. Cai, Y. Wu, Cellulose 2013, 20, 303 and T. Saito, M. Hirota, N. Tamura, S. Kimura, H. Fukuzumi, L. Heux, A. Isogai, *Biomacromolecules* 2009, 10, 1992.) Specifically, in order to obtain a 0.4 weight percent (wt. %) nanofiber hydrogel, deionized water was added to a centrifuged NFC suspension before the mixture was mechanically homogenized on an M-110EH-30 Microfluidizer (Microfluidics, Newton, Mass., USA) with a series of 200- and 87-µm chambers via two pass-throughs. After printing this NFC hydrogel on Fluorine doped Tin Oxide (FTO) glass substrates, the substrate with the hydrogel film was frozen in a liquid nitrogen and ethanol bath. Next, the substrate was immediately and quickly transferred into the vacuum chamber of a Labconco 4.5 Freeze Dryer (Labconco, Kansas City, Mo., USA) with a stable pressure of about 35 mTorr for 12 hours at room temperature, where sublimation of the ice yielded a film comprising a porous network of cellulose nanofibers, 10 µm thick, on the FTO. Wafer-scale films were fabricated, as shown in the inset of FIG. 4.

Fabrication of Photoanodes Comprising a Porous Network of $TiO_2$ Nanotubes: The films comprising porous networks of cellulose nanofibers were loaded in an ALD chamber for amorphous $TiO_2$ overcoating at 150° C. The ALD growth cycle consisted of 0.5 s $H_2O$ pulsing+60 s $N_2$ purging+0.5 s titanium tetrachloride ($TiCl_4$) pulsing+60 s $N_2$ purging. 350 cycles yielded a 30 nm thick amorphous $TiO_2$ coating on the cellulose nanofiber network. The resulting CNF-amorphous $TiO_2$ core-shell structures were annealed in oxygen (600° C., 24 hours, 390 mTorr) or vacuum (600° C., 24 hours, 55 mTorr) to convert the amorphous $TiO_2$ into its anatase phase. Through this process, CNFs were also removed, leaving a porous network of $TiO_2$ nanotubes. Then, another thin film of anatase $TiO_2$ was coated onto the entire sample by 400-cycle ALD at 300° C. to make a continuous cover on the $TiO_2$ fibrous nanotubes and exposed FTO area. Finally, the samples were further annealed in oxygen at 500° C. for 10 hours to eliminate carbonized cellulose residues outside of the $TiO_2$ crystals to avoid possible undesired electrochemical reactions during PEC measurements.

PEC Cell Setup and Characterization: The $TiO_2$ nanotube networks on the FTO substrates were covered by epoxy leaving an exposed active area of ~0.6 mm² as the photoanode. For the capillary PEC cell, an electrolyte-transporting strip comprising a porous network of cellulose nanofibers was adhered on the bottom side of the porous network of $TiO_2$ nanotubes.

PEC measurements were performed in a 1 mol L$^{-1}$ KOH (pH=14) aqueous solution using the three-electrode electrochemical cell configuration shown in FIG. 2. In the PEC measurements, a saturated calomel electrode (SCE) was used as the reference electrode and a Pt wire was used as the counter electrode. All electrodes were connected to a potentiostat system (Metrohm Inc., Riverview, Fla.) for J-V characterization. Light illumination was provided by a 150W Xe arc lamp (Newport Corporation, Irvine, Calif.) and the intensity at the photoanode position was adjusted to be 100 mW cm$^{-2}$. An AM 1.5G filter and a UV cut off filter were also utilized with the lamp for PEC characterization.

Figure 5:
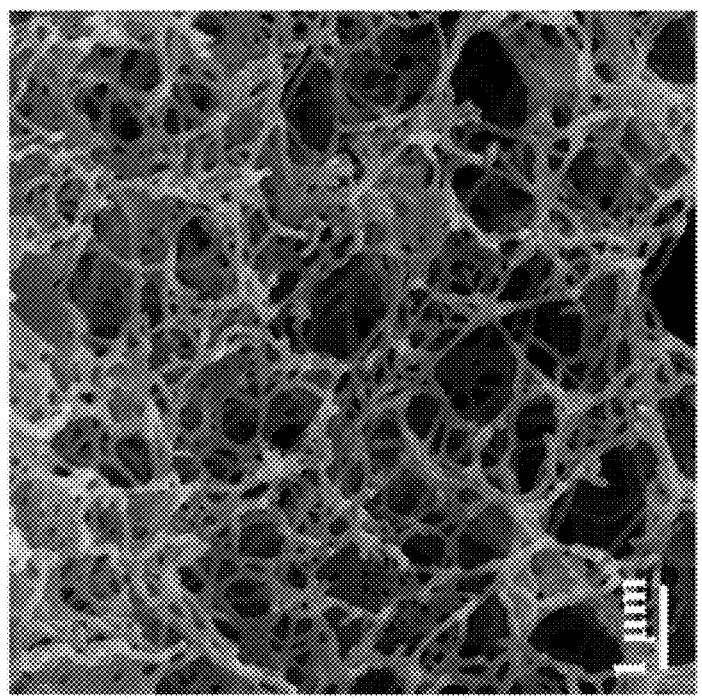
FIG. 5. Morphology and structure of a porous network of cellulose nanofibers coated with $TiO_2$ via 350 cycles of atomic layer deposition (ALD) at 150° C.

Results:

Scanning electron microscopy (SEM) of the TiO$_2$ nanofiber network films revealed a highly-porous network structure composed of dense CNFs (FIG. 4). The fibrous nanostructure was well preserved after the TiO$_2$ thin film conformal coating was applied, yielding an overall fiber diameter of ~100 nm (FIG. 5). The annealing treatment crystallized the amorphous TiO$_2$ coating, as well as burned away the CNF templates. It is noteworthy that the fibrous 3D TiO$_2$ nanofiber network structure was very stable during the vigorous heat treatment and no obvious dimensional or morphology change was observed (FIG. 6), except that the CNF core-TiO$_2$ shell fibers were converted into TiO$_2$ nanotubes (inset of FIG. 6).

Figure 7:
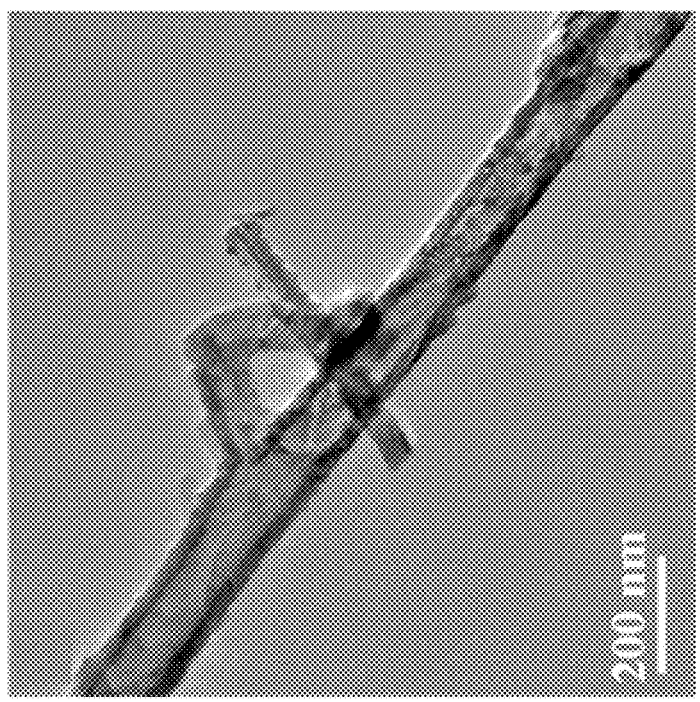
FIG. 7. TEM image of a hollow $TiO_2$ nanotube obtained after annealing.
Figure 8:
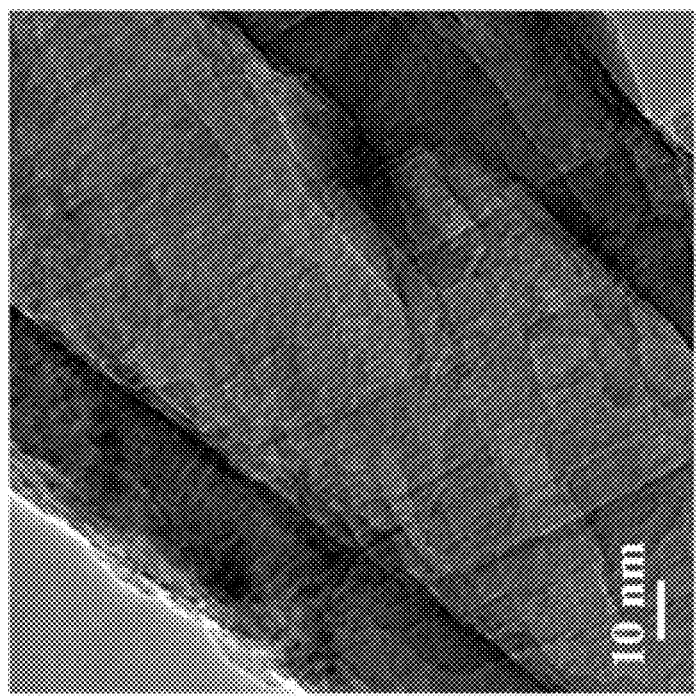
FIG. 8. Higher resolution TEM image of the nanotube of FIG. 7, showing the uniform thickness of $TiO_2$ nanotube walls and a large crystalline domain area.
Figure 9:
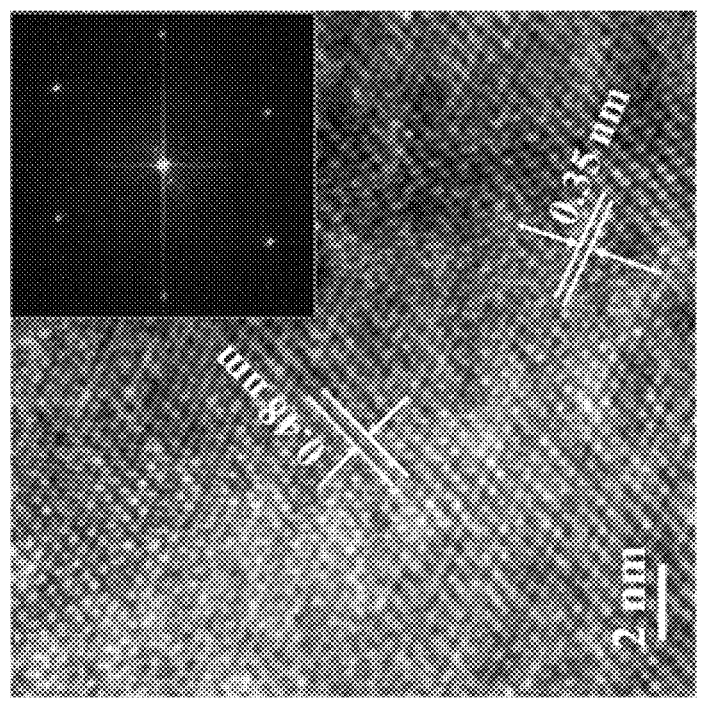
FIG. 9. HRTEM image showing the single-crystal region obtained from a $TiO_2$ nanotube shell. The lattice spacing and FFT (inset) indicates the anatase phase.

The crystal structure of the CNF-templated TiO$_2$ nanotubes was further investigated by transmission electron microscopy (TEM). Low-magnification TEM images clearly demonstrated the tubular nature of the TiO$_2$ nanofibers after annealing (FIG. 7). The thickness of the TiO$_2$ layer was identified to be 25~30 nm, which was consistent with the 350 cycles of ALD (FIG. 8). The TiO$_2$ nanotubes were polycrystalline with a fairly large single-crystalline domain (~20-50 nm in one dimension). High-resolution TEM (HR-TEM) revealed a single-crystalline domain region obtained from the TiO$_2$ nanotube (FIG. 9). The crystal lattice spacing and the diffraction pattern from fast Fourier transform (FFT) suggested the anatase phase of the TiO$_2$ nanotubes. Powder X-ray diffraction (XRD) further confirmed the pure anatase TiO$_2$ phases after 24 hours of annealing treatment.

The PEC performance of the CNF-templated TiO$_2$ nanotube network and the unique capability of the porous networks of CNFs as an electrolyte-transporting medium in PEC cells were investigated using the "out-of-electrolyte" capillary photoelectrode, schematically shown in FIG. 1. The photoanode comprising a porous network of active TiO$_2$ nanotubes was placed on a conductive substrate and covered by epoxy, as previously described, leaving an exposed area at the center. The photoanode bottom was in contact with a strip comprising a porous network of CNFs that was used to draw and transport electrolyte to the TiO$_2$ photoanode surface. The resulting capillary PEC cell is shown schematically in FIG. 2. In this PEC cell design, the photoanode was placed outside of the electrolyte body, above its surface. Due to the excellent hydrophilic property of the CNF network, capillary force was able to drive electrolyte from the body of the electrolyte to the porous TiO$_2$ nanotube network active area quickly and continuously. As described below, enhanced PEC reaction kinetics were provided by the dynamic and infinitesimal electrolyte volume supplied, via capillary force, to the photoanode.

To investigate the performance of this capillary PEC cell design, the photocurrent density ($J_{ph}$) versus bias potential characteristics of both a capillary PEC cell and a conventional "in-electrolyte" PEC cell were measured under illumination of 100 W cm$^{-2}$ from a Xe lamp source without and with an AM 1.5G filter. The dark current densities of both cells remained at small values (<10 mA cm$^{-2}$) within bias potentials scanned between -1.2 V and 0.5 V (vs. SCE), demonstrating a high quality of the crystal surfaces of the fibrous TiO$_2$ nanotubes. Generally, $J_{ph}$ was significantly higher under the Xe lamp than under the AM 1.5G filter (e.g. 0.87 vs. 0.10 mA cm$^{-2}$), because a large amount of UV light was cut off by the filter. This phenomenon suggests that the performance of the photoanode comprising a porous network of anatase TiO$_2$ nanotubes was dominated by UV absorption. Under Xe lamp illumination, $J_{ph}$ measured from the capillary PEC setup was more than twice as much as that from the in-electrolyte PEC cell setup. Corresponding efficiencies were estimated using following equation:

$$\eta\% = J_{ph}(E_{rev}^0 - |E_{bias} - E_{aoc}|)\frac{100}{I_0} \qquad (1)$$

where $E_{bias}$ is the bias potential; $E_{rev}^0$=1.23 V is the standard state reversible potential for the water-splitting reaction; and $E_{aoc}$=$V_{oc}$ is the open circuit voltage (vs. SCE). The capillary PEC cell setup exhibited a maximum efficiency of 0.45% at ~-0.65 V; whereas the in-electrolyte PEC cell setup had only a maximum efficiency of 0.16% at ~-0.45 V. When AM 1.5G illumination was applied, both $J_{ph,ex}$ and $J_{ph,in}$ were significantly decreased. Although $J_{ph,ex}$ was still higher than $J_{ph,in}$, their difference became much smaller. Following Equation 1, the maximum efficiencies of the capillary and in-electrolyte PEC processes were found to be 0.04% at ~-0.45 V and 0.03% at ~-0.35 V, respectively.

The stabilities of the cellulose-templated, porous TiO$_2$ nanofiber network photoanode and the capillary PEC configuration were further evaluated by measuring $J_{ph}$ at a constant bias of 0.3 V (vs. SCE) under 100 mW cm$^{-2}$ Xe lamp illumination. After an initial drop of 1.4% ($J_{ph}$ changed from 0.73 to 0.72 mA cm$^{-2}$) during the first 60 minutes, $J_{ph}$ remained at 0.72 mA cm$^{-2}$ for 12 hours without appreciable further decrease. This measurement confirms good structural and functional stability of the TiO$_2$ nanofiber-based photoanode. It also suggests that the capillary PEC cell design could function continuously and stably without any electrolyte transport or local reaction kinetic variation issues.

In order to understand the performance enhancement from the capillary PEC cell design, a series of analyses were performed on the reaction environment and kinetics. Firstly, it is intuitive to imagine that less electrolyte body volume in front of the photoanode would result in higher light intensity that can be practically absorbed. Thus, the power densities of the illumination at fixed distances from the lamp were quantified. A linear decrease of the power density was found showing a rate of ~9.1 mW cm$^{-2}$ per 1 cm passing length through 1 mol L$^{-1}$ KOH electrolyte. Therefore, the capillary PEC cell had the least amount of electrolyte covering the photoanode surface, which ensures the highest intensity of available light for absorption. This advantage becomes particularly significant when large amounts of photo-catalyst need to be applied within a confined volume of electrolyte.

Secondly, by performing J-V measurement under interrupted illumination, it was found that the reaction kinetics were slightly enhanced in the capillary PEC cell. The J-V curves of the same porous TiO$_2$ nanotube network photoanode collected from capillary and in-electrolyte setups under interrupted 100 mW cm$^{-2}$ Xe lamp illumination were compared. The dark currents for both setups were negligibly low. For in-electrolyte setup, the emblematical anodic current spike was obvious at the point when the illumination was on; whereas for the capillary PEC cell setup, such spikes were less distinguishable. These current spikes are known by evidence of accumulated photoexcited holes at the semiconductor-electrolytes interface. (See, F. L. Formal, N. Tétreault, M. Cornuz, T. Moehl, M. Gratzel, K. Sivula, Chem. Sci. 2011, 2, 737.) They are a result of carrier oxidized trap states of the semiconductor, or slow oxygen evolution reaction kinetics. (See, G. Horowitz, J. Electroanal. Chem. 1983, 159, 421; C. Sanchez, K. Sieber, G.

Somorjai, *J. Electroanal. Chem.* 1988, 252, 269 and M. Dareedwards, J. Goodenough, A. Hamnett, P. Trevellick, *J. Chem. Soc. Faraday Trans.* 1 1983, 79, 2027.) Such spikes can be suppressed when photoexcited holes experience less or no barrier to oxidizing the electrolyte under better interface charge transport kinetics.

Based on the above discussion, the photo-oxidation reaction kinetics at the $TiO_2$ surfaces can be compared for both the out-of-electrolyte and in-electrolyte photoanode configurations from the shape of the spikes. From the area under the anodic current spike, the number of accumulated holes at the $TiO_2$-electrolyte interface were estimated, which is analogous to calculating the amount of accumulated charges in a capacitor of an RC circuit by equation:

$$I(t) = I_0 e^{-\frac{t}{\tau_0}} = \frac{dQ(t)}{dt} \quad (2)$$

where $I_0$ is the initial current and $\tau_0$ is the time constant of the system. For this situation, the area density ($cm^{-2}$) of accumulated holes can be approximated by integrating $J(t)$ dt. From both J-V curves, the accumulated hole densities were estimated to be $8.24 \times 10^{12}$ $cm^{-2}$ for the in-electrolyte PEC cell and $3.43 \times 10^{12}$ $cm^{-2}$ for the capillary PEC cell. The lower interfacial hole concentration suggests a lower transient over potential ($\Delta\phi$) for oxidation reactions. Because identical $TiO_2$ fibrous photoanodes were used in both cases, $\Delta\phi$ (eV) is likely associated with the Fermi level shift of the redox couple in the electrolyte, which is directly related to the pH value in the KOH system following Equation 3.

$$\Delta\phi = 0.059 \times (pH - 14) \quad (3)$$

The pH values corresponding to the over potential found in the capillary PEC cell was calculated to be ~14.02, suggesting the $OH^-$ concentration is slightly higher than the actual electrolyte concentration (1M KOH, pH=14). To further confirm the pH relationship, in-electrolyte PEC was conducted using the same $TiO_2$ photoanode under interrupted illumination in KOH electrolytes with pH=14.02, 14.2, respectively. Most of the anodic current spikes disappeared at the higher pH values. The higher pH value at the photoactive site was possibly due to solvent volatilization during electrolyte transport through the porous network of CNFs. This effect is beneficial to local reaction kinetics. However, it may become impedimental in practical applications when the transportation path is too long and where the electrolyte may completely dry out. This limitation can be circumvented by encapsulating the cellulose transport path.

Another significant merit of using cellulose nanofibers as templates for the fabrication of the porous network of $TiO_2$ nanotubes is their ability to modulate the chemical composition of the ultimate $TiO_2$ networks. Previous measurements were all based on fibrous networks of anatase $TiO_2$ nanotubes processed by annealing in $O_2$ atmosphere, where the cellulose nanofibers were completely removed and the final structure appeared pure white. However, when annealed in vacuum (600° C., 24 hours, 55 mTorr), the resulting $TiO_2$ nanostructure turned black, though the cellulose nanofiber cores were also fully removed. EDS analysis showed an appreciable amount of carbon (~10%) was preserved in the final $TiO_2$ nanotube network. The existence of carbon in the $TiO_2$ nanotube network and the resultant black color suggests significant visible light absorption and possible visible light photoactivity of the $TiO_2$ photoanode, which may further enhance the PEC performance. To test this hypothesis, both capillary and in-electrolyte PEC cell setups were applied to characterize the J-V curves under Xe lamp illumination. Both setups exhibited higher $J_{ph}$ compared to the results from the "white" $TiO_2$ photoanode. Following Equation 1, the maximum efficiencies of the "black" $TiO_2$ photoanode were identified to be 0.85% and 0.58% for the capillary and in-electrolyte setups, respectively.

The possible visible light photoactivity was further investigated by comparing the "black" and "white" porous $TiO_2$ nanotube network photoanodes using the capillary PEC setup and AM 1.5G and visible light (UV filter applied) illuminations, as described previously. Under both illumination conditions, $J_{ph}$ from the "black" $TiO_2$ photoanode was almost an order of magnitude higher than that from the "white" $TiO_2$. Corresponding efficiencies were calculated and are summarized in Table 1 for comparison.

TABLE 1

Summary of Photocurrent Densities and PEC Efficiencies of Photoanodes comprising Porous Networks of $TiO_2$ Nanotubes measured under different conditions.

| PEC Cell Setup | Annealing ambient | UV cut off filter | AM 1.5 G filter | J (mA $cm^{-2}$) | η (%) |
|---|---|---|---|---|---|
| Capillary Setup | Oxygen | No | No | 0.87 | 0.45 |
| | Oxygen | No | Yes | 0.10 | 0.04 |
| | Oxygen | Yes | No | 0.03 | 0.01 |
| | Vacuum | No | No | 1.61 | 0.85 |
| | Vacuum | No | Yes | 0.47 | 0.20 |
| | Vacuum | Yes | No | 0.26 | 0.09 |
| In-electrolyte Setup | Oxygen | No | No | 0.42 | 0.16 |
| | Oxygen | No | Yes | 0.08 | 0.03 |
| | Oxygen | Yes | No | 0.02 | 0.01 |
| | Vacuum | No | No | 1.10 | 0.58 |
| | Vacuum | No | Yes | 0.32 | 0.15 |
| | Vacuum | Yes | No | 0.15 | 0.07 |

In general, $J_{ph}$ and PEC efficiencies of the capillary setups were higher than those obtained from the in-electrolyte setup owing to less electrolyte-related light scattering and better local reaction kinetics. For both PEC cell setups, the vacuum-annealed $TiO_2$ nanostructures exhibited significantly higher PEC performance compared to the ones annealed in oxygen due to the activation of visible light photoactivity.

In summary, 3D CNF networks were used as templates for fabricating PEC photoanodes via ALD of $TiO_2$. Annealing the CNF-$TiO_2$ core-shell nanostructures created a porous 3D anatase $TiO_2$ nanotube network architecture, which offered tremendous surface area for PEC water splitting. Based on the excellent hydrophilic property of cellulose, a capillary PEC cell was developed. Capillary forces in an electrolyte-transporting network of CNFs quickly and continuously transported electrolyte from a body of aqueous electrolyte to the photoanode surface during PEC water splitting. Better reaction kinetics and higher efficiency were achieved from the capillary PEC cell design compared to a conventional in-electrolyte PEC cell design. In addition, annealing the CNF-$TiO_2$ core-shell structure in vacuum preserved the carbon elements in the resulting $TiO_2$ nanotubes, and thus activated photoactivity in the visible light region. The cellulose-based nanomanufacturing technique is useful for large-area, low-cost, and green fabrication of functional nanomaterials. Using cellulose in capillary PEC cell mimics the mass transport process in natural photosynthesis, where the interaction between light and reaction sites is no longer limited by the volume, surface and depth of electrolyte.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A photoelectrochemical cell comprising:
   (a) a body of electrolyte;
   (b) a capillary photoelectrode structure comprising:
      an electrolyte-transporting strip comprising a porous network of cellulose nanofibers; and
      a working electrode comprising a porous photocatalytic material;
      wherein the electrolyte-transporting strip separates the body of electrolyte from the porous photocatalytic material and is configured to transport electrolyte from the body of electrolyte to the porous photocatalytic material via capillary force; and
   (c) a counter electrode in electrical communication with the working electrode.

2. The cell of claim 1, wherein the working electrode further comprises an electrically conductive substrate to which the porous photocatalytic material attached.

3. The cell of claim 1, wherein the electrolyte is an aqueous electrolyte.

4. The cell of claim 3, wherein the aqueous electrolyte is sea water.

5. The cell of claim 1, wherein the porous photocatalytic material comprises a porous network of photocatalytic semiconducting nanofibers.

6. The cell of claim 5, wherein the photocatalytic semiconducting nanofibers are metal oxide nanofibers.

7. The cell of claim 6, wherein the metal oxide nanofibers are $TiO_2$ nanotubes.

8. The cell of claim 7, further comprising a carbon film disposed within the interior surfaces of the $TiO_2$ nanotubes.

9. The cell of claim 1, wherein the electrolyte-transporting strip has a first portion that is in contact with the porous photocatalytic material and a second portion that is in contact with the body of electrolyte.

10. A method of producing hydrogen using a photoelectrochemical cell having a capillary photoelectrode structure comprising: an electrolyte-transporting strip comprising a porous network of cellulose nanofibers; and a working photoelectrode comprising a porous photocatalytic material in contact with a first portion of the electrolyte-transporting strip, the method comprising:
   contacting a second portion of the electrolyte-transporting strip with a body of aqueous electrolyte, whereby aqueous electrolyte from the body of aqueous electrolyte is transported through the porous network of cellulose nanofibers and into the porous photocatalytic material via capillary force;
   exposing the porous photocatalytic material and the aqueous electrolyte contained therein to radiation that induces the photoelectrochemical splitting of water in the aqueous electrolyte to $H_2$ and $O_2$; and
   collecting the $H_2$.

11. The method of claim 10, wherein the aqueous electrolyte is sea water.

12. The method of claim 11, wherein the radiation is solar radiation.

13. The method of claim 10, wherein the porous photocatalytic material comprises a porous network of photocatalytic semiconducting nanofibers.

14. The method of claim 13, wherein the photocatalytic semiconducting nanofibers are metal oxide nanofibers.

15. The method of claim 14, wherein the metal oxide nanofibers are $TiO_2$ nanotubes.

16. A photocatalytic cell comprising:
   (a) a body of electrolyte; and
   (b) a capillary photocatalytic structure comprising:
      an electrolyte-transporting strip comprising a porous network of cellulose nanofibers; and
      a photocatalytic substrate comprising a porous photocatalytic material;
      wherein the electrolyte-transporting strip separates the body of electrolyte from the porous photocatalytic material and is configured to transport electrolyte from the body of electrolyte to the porous photocatalytic material via capillary force.

17. The cell of claim 16, wherein the electrolyte is an aqueous electrolyte.

18. The cell of claim 17, wherein the aqueous electrolyte is sea water.

19. The cell of claim 16, wherein the porous photocatalytic material comprises a plurality of metal nanoparticles in a porous network of photocatalytic semiconducting nanofibers.

20. The cell of claim 16, wherein the electrolyte-transporting strip has a first portion that is in contact with the porous photocatalytic material and a second portion that is in contact with the body of electrolyte.

21. A method of producing hydrogen using a photocatalytic cell having a capillary photocatalytic structure comprising: an electrolyte-transporting strip comprising a porous network of cellulose nanofibers; and a photocatalytic substrate comprising a porous photocatalytic material in contact with a first portion of the electrolyte-transporting strip, the method comprising:
   contacting a second portion of the electrolyte-transporting strip with a body of aqueous electrolyte, whereby aqueous electrolyte from the body of aqueous electrolyte is transported through the porous network of cellulose nanofibers and into the porous photocatalytic material via capillary force;
   exposing the porous photocatalytic material and the aqueous electrolyte contained therein to radiation that induces the photocatalytic splitting of water in the aqueous electrolyte to $H_2$ and $O_2$; and
   collecting the $H_2$.

22. The method of claim 21, wherein the porous photocatalytic material comprises a plurality of metal nanoparticles in a porous network of photocatalytic semiconducting nanofibers.

* * * * *